Aug. 14, 1934.  H. FLORET  1,970,420
EMERGENCY GOVERNOR MECHANISM FOR PRIME MOVERS
Filed Aug. 18, 1932
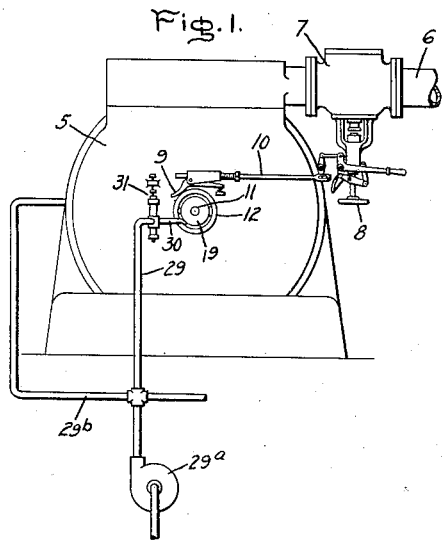
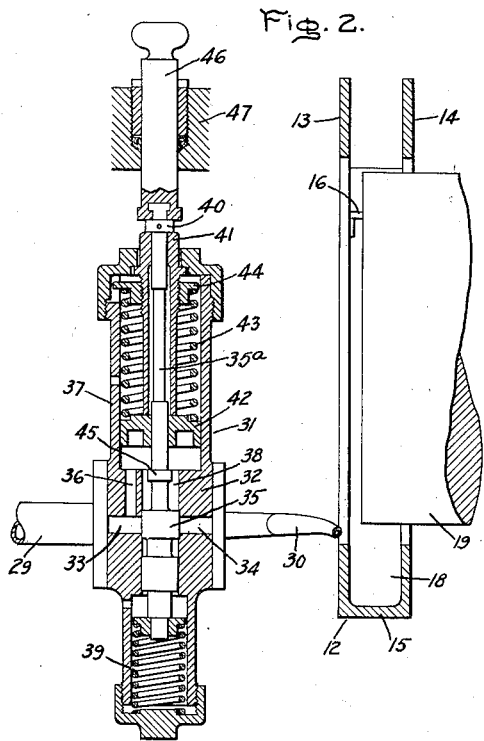
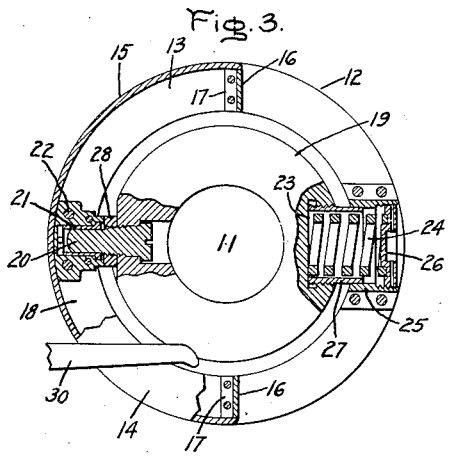
Inventor:
Heinrich Floret,
by Charles W. Tullar
His Attorney.

Patented Aug. 14, 1934

1,970,420

UNITED STATES PATENT OFFICE 1,970,420

EMERGENCY GOVERNOR MECHANISM FOR PRIME MOVERS

Heinrich Floret, Spandau, Germany, assignor to General Electric Company, a corporation of New York Application August 18, 1932, Serial No. 629,381 In Germany September 26, 1931

4 Claims. (Cl. 137—153)

The present invention relates to emergency governor mechanisms for prime movers, such as elastic fluid turbines and the like in which the emergency mechanism comprises in part a member carried by a rotating shaft and biased by its weight, a spring or other suitable means, to one position and adapted to be moved by centrifugal force, in case of excess speed, to trip a valve mechanism which shuts off the supply of elastic fluid to the prime mover. The emergency governor is set to trip the valve mechanism when a speed of predetermined amount above normal speed is reached. The invention relates more specifically to safety devices operated by fluid pressure and including valve means which are opened when a certain condition, for instance a certain pressure of the fluid, is reached. Such devices are used in connection with governor mechanisms wherein means are provided for supplying oil or other liquid under pressure to the governor for effecting its operation at normal speed for testing or other purposes. Such an arrangement is shown, for example, in a patent to Dryer, No. 1,666,490, April 17, 1928.

Ordinarily in connection with a mechanism of this kind, the fluid supplied to the governor for testing purposes is oil from an oil pump which serves also to supply oil to other operating parts of the turbine or similar machine, such as the bearings, valve gear and the like. It is important that the oil pressure be maintained. The object of the present invention is to provide an improved construction and arrangement whereby in case the oil pressure supplied to the turbine parts decreases below a predetermined high value, oil will be supplied automatically to the emergency governor to cause it to operate and close the emergency valve. Another object of the invention is to provide an improved safety device whereby a valve is opened with decreasing fluid pressure and again automatically closed when the decreasing fluid pressure has reached a certain low value.

For a consideration of what I believe to be novel and my invention, attention is directed to the accompanying description and the claims appended thereto.

In the drawing, Fig. 1 is a diagrammatic view showing my invention applied to an elastic fluid turbine; Fig. 2 is a view showing in section a valve structure which forms a part of the invention; and Fig. 3 is an end view partly in section of emergency governor as indicated diagrammatically in Figs. 1 and 2.

Referring to the drawing, 5 indicates an elastic fluid turbine having an inlet conduit 6 in which is located a valve mechanism 7. The valve mechanism indicated is a well-known type of combined trip and throttle valve adapted to be opened and closed manually by hand wheel 8 and adapted to close automatically whenever trip finger 9 is actuated to release spring pressed rod 10. The foregoing turbine and valve arrangement is shown only by way of example and is to be taken as typical of any suitable valve arrangement adapted to be tripped and closed automatically by an emergency governor.

Mounted on shaft 11 of the turbine is an emergency governor in the form of a ring 12 comprising two walls 13 and 14 held in spaced relation to each other by a wall 15 which extends part way around the ring. At the ends of walls 15 are radially extending partition plates 16 having flanges 17 riveted to walls 13 and 14. It will thus be seen that walls 13, 14 and 15 and partition plates 16 form a pocket 18 located on one side of ring 12. Ring 12, which may be termed an outer ring, is mounted on an inner ring 19, which in turn is fixed directly on shaft 11, the connection between rings 12 and 19 being such that when a predetermined speed is reached ring 12 will be moved transversely relatively to ring 19 by centrifugal force, and striking the end of finger 9, trip the emergency valve mechanism and permit it to automatically close. To this end ring 19 is provided on one side with a guide pin 20 which enters a socket 21 formed in a block 22 carried by the central portion of wall 15, the block being located about midway between the two ends of pocket 18. On the opposite side of ring 19 is a socket 23 in which is located one end of a coiled spring 24. The other end of spring 24 enters a cylinder 25 fixed between walls 13 and 14 and engages a head 26 having threaded engagement with cylinder 25 so that by screwing the head into and out of the cylinder, the tension of spring 24 can be adjusted. 27 is a guide member for ring 12, the same being in the form of a sleeve surrounding spring 24 with one end fixed in socket 23 and the other having sliding engagement with cylinder 25. The left-hand side of ring 12 as shown in Fig. 3, that is, the side containing pocket 18, is heavier than the other side so that when the shaft is rotating, ring 12 tends to move transversely of the shaft. In other words, the center of gravity of ring 12 is located on one side of its geometrical center or the center about which it rotates. It is held from such movement by spring 24 which tends to hold ring 12 in the position shown in Fig. 3 with the end of block 22 against a stop nut as indicated at 28. After a predetermined speed is reached, the centrifugal force exerted on ring 12 will be sufficient to overcome spring 24 and move ring 12 transversely of the shaft so it will engage trip finger 9 and effect the closing of the emergency valve. In ordinary practice, the tension of spring 24 will be adjusted so the emergency mechanism will operate at a speed a predetermined amount above normal speed.

In order to test the emergency mechanism at any time without running the machine at the excess speed for which the emergency governor is set, there is provided a pipe 29 having a nozzle 30 through which oil may be discharged into the pocket 18. Pipe 29 is connected with an oil pump 29ª which supplies oil under pressure through pipes 29ᵇ to other turbine parts, for example, to the turbine bearings. The construction so far described is in general that disclosed in the above referred to Dryer patent and is to be taken as typical of an arrangement of this kind wherein oil under pressure is supplied for effecting operation of an emergency governor at normal operating speed.

The invention comprises an improved construction and arrangement whereby in case the oil pressure decreases below a predetermined high value, oil will be admitted automatically through pipe 29 to the emergency governor to effect its operation.

According to the embodiment of the invention illustrated in drawing, there is provided in pipe 29 a valve structure 31 which is capable of being operated manually for effecting operation of the emergency governor and which operates automatically in case the pressure decreases below a predetermined value to supply oil to the emergency governor to effect its operation, the oil supply being cut off after the pressure reaches a certain low value.

Valve structure 31 comprises valve casing 32 having an inlet port 33 connected with pipe 29 and a discharge port 34 connected to the nozzle 30. The flow of oil from port 33 to port 34 is controlled by a valve head 35 carried by valve stem 35ª. Port 33 is connected by a passage 36 to the lower end of a cylinder 37 which forms an extension of the valve body. The lower end of cylinder 37 connects through passage 38 with the top surface of valve head 35, whereby the upper surface of the valve head surrounding the stem is subjected to the oil pressure. This oil pressure serves to hold valve head 35 in a position wherein it covers ports 33 and 34 as shown in the drawing, it being held in this position against the action of a spring 39 arranged beneath the valve and tending to move it in an upward direction. Downward movement of the valve head is limited by a stop 40 at the upper end of the stem which engages the upper end of a sleeve 41 located in cylinder 37. In cylinder 37 is a piston 42 which slides on valve stem 36 and is normally pressed downward by a spring 43 located between the upper side of piston 42 and an adjustable spring holder 44 threaded on sleeve 41. Normally, the oil pressure in cylinder 37 beneath piston 42 is sufficient to overcome the action of spring 43 so as to hold piston 42 in its upper position against the bottom of sleeve 41 as shown in Fig. 2 of the drawing.

On valve stem 35ª is a stop 45 adapted to be engaged by piston 42. Connected to the upper end of valve stem 35ª is a knob 46 by means of which valve head 35 may be moved manually. Knob 46 slides in a wall 47 which may be a part of the turbine or other prime mover in connection with which the device is used.

The operation of the invention is as follows:

When the turbine is operating and the oil pressure is at normal value, the parts of valve 31 stand in the positions shown in Fig. 2, valve body 35 covering ports 33 and 34, and piston 42 being in its upper position. If the pressure decreases a certain amount below the predetermined high value, spring 39 overcomes the pressure of the oil on the top surface of valve body 35, forcing the valve body upward to bring stop 45 into engagement with the under side of piston 42 and to uncover ports 33 and 34. Oil then flows through valve nozzle 30 from which it is discharged to the emergency governor, effecting its operation and the closing of the emergency valve. When the oil pressure decreases further, spring 43 overcomes the pressure of the oil, forcing piston 42 and valve body 35 downward to normal position wherein valve body 35 covers ports 33 and 34. The oil supply to the emergency governor is thus shut off.

At any time, valve body 35 may be lifted manually by means of knob 46 to admit oil to the emergency governor, whereby it may be caused to operate and the valve 7 tripped closed.

With the above described arrangement, it will be seen that there is provided means whereby in case the oil pressure of a pump supplying various parts of a turbine fails, the emergency valve gear is operated to shut down the turbine.

What I claim as new and desire to secure by Letters Patent of the United States is:

1. In a safety device, the combination of a valve having inlet and outlet ports and a movable valve member normally covering the ports, spring means biasing the member in one direction, said member being adapted to be biased in the opposite direction by fluid pressure to normally balance the biasing force of the spring means and to automatically cause opening movement of the member at decreasing fluid pressure, and other means for automatically moving the valve towards closed position against the bearing force of the spring at a certain low fluid pressure.

2. In a safety device, the combination of a valve having inlet and outlet ports and a movable valve member normally covering the ports, spring means biasing the member in one direction, said member being adapted to be biased in the opposite direction by fluid pressure to normally balance the biasing force of the spring means and to automatically cause opening movement of the member at decreasing fluid pressure, and other means for automatically moving the valve towards closed position at a certain low fluid pressure, the other means comprising a piston having one side subject to said fluid pressure and a spring biasing the piston in the direction opposite to the fluid pressure.

3. In a safety device, the combination of a valve having inlet and outlet ports, means for conducting fluid under pressure to the inlet port, a valve stem having a head normally covering the ports, spring means biasing the head in one direction, said head being adapted to be biased in the opposite direction by fluid pressure permitting opening movement of the head at decreasing fluid pressure, and means for automatically moving the head towards closed position at a certain low fluid pressure comprising a piston telescoping the stem and having one side subject to said fluid pressure, a spring biasing the piston in a direction opposite to the fluid pressure and a stop fastened to the stem, the piston engaging the stop at a certain low pressure and forcing the stem with the head towards closed position with a further decrease in fluid pressure.

4. In a safety device, the combination of a valve having inlet and outlet ports and a movable valve member normally covering the ports, spring means biasing the member in one direction, said member being adapted to be biased in the opposite direction by fluid pressure to normally balance the biasing force of the spring means and to automatically cause opening movement of the member at decreasing fluid pressure, other means for automatically moving the valve towards closed position at a certain low fluid pressure, and means for manually moving the valve.

HEINRICH FLORET.